M. ZAWISTOWSKI.
CLOTH CUTTING MACHINE.
APPLICATION FILED DEC. 11, 1918.
1,319,809.
Patented Oct. 28, 1919.
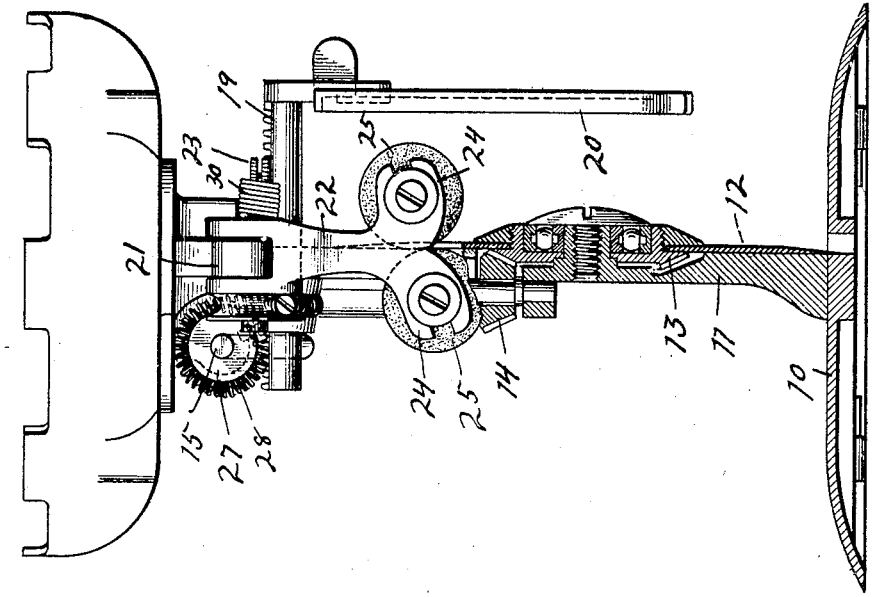
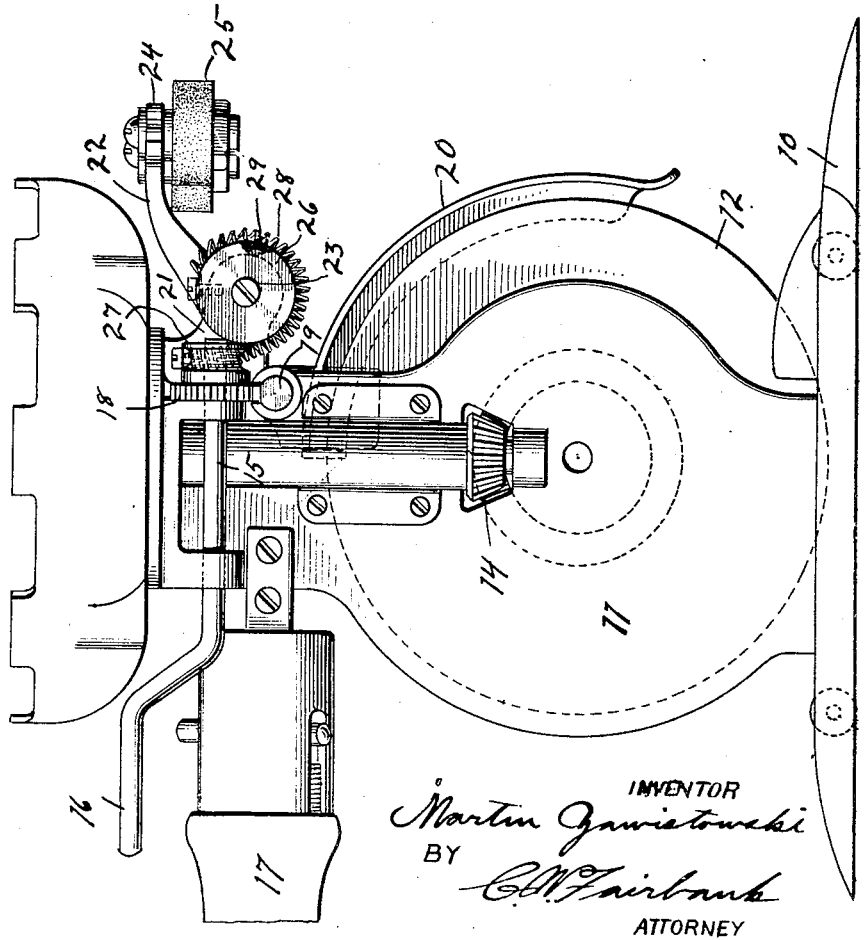
INVENTOR
Martin Zawistowski
BY
C. W. Fairbank
ATTORNEY

UNITED STATES PATENT OFFICE.

MARTIN ZAWISTOWSKI, OF BROOKLYN, NEW YORK.

CLOTH-CUTTING MACHINE.

1,319,809. Specification of Letters Patent. Patented Oct. 28, 1919.

Application filed December 11, 1918. Serial No. 266,231.

*To all whom it may concern:*

Be it known that I, MARTIN ZAWISTOWSKI, a citizen of the United States, and a resident of Brooklyn, in the county of Kings and State of New York, have invented certain new and useful Improvements in Cloth-Cutting Machines, of which the following is a specification.

This invention is an improvement in cloth cutting machines of the rotary knife type and relates particularly to the grinder or sharpener mechanism and the means for bringing it into and out of operative position. In my improved construction I employ an oscillatory operating member for swinging an oscillating grinder carrier into or out of engagement with the knife. I am aware that it has heretofore been proposed to connect this operating member and the grinder carrier by a pair of intermeshing miter gears. This necessitates a very careful and accurate positioning of the two axes so that they intersect in the same plane and the accurate positioning of the gears on the two shafts. In my improved construction I connect the two shafts by a flexible member so disposed that power is transmitted through it as the operating member is oscillated. By means of my improved construction, it is unnecessary to exercise any particular care in locating the bearings of the two shafts in respect to each other as the axis of the grinder carrier may be materially below or at any desired angle in respect to the axis of the operating member. Furthermore by lowering the axis of the grinder carrier, this axis may be brought nearer to the edge of the knife and the grinder carrier may be made correspondingly shorter and lighter. Furthermore, my improved construction is very much cheaper to manufacture, easier to adjust, easier to assemble, and eliminates any lost motion such as often occurs between the teeth of intermeshing gears.

In the accompanying drawings I have illustrated one embodiment of my invention, although it will of course be understood that various other forms may be designed within the scope of the appended claims and within the spirit of my invention.

In these drawings:

Figure 1 is a side elevation, the grinder being in raised or inoperative position and the electric motor being removed from the motor base, and Fig. 2 is a front view, the grinder being shown in lowered or operative position and the knife and its supporting parts being shown in section.

In the specific form illustrated there is employed the usual base 10 with its standard 11, on which is mounted a rotary knife 12. Connected to the latter is a gear wheel 13 meshing with a pinion 14 on a shaft connected to or forming an extension of the motor shaft. The standard 11 above the knife supports an operating member in the form of a shaft 15, having a crank handle 16 adjacent to the main handle 17 of the machine. This shaft 15 has a gear wheel 18 thereon which meshes with a rack bar 19 disposed substantially parallel to the axis of the knife. This rack bar carries a knife guard 20 normally substantially following the curved edge of the knife and disposed adjacent to and over the latter but movable laterally, that is, in a direction substantially parallel to the axis of the knife to bring it away from the knife when it is desired to sharpen the latter. This form of guard and supporting operating mechanism therefor is more fully described and claimed in a co-pending application.

The standard 11 at the front end of the machine has a lug 21 upon which is mounted a grinder carrier 22 by means of a pivot pin 23. This pivot pin is shown as substantially parallel to the axis of the knife and below the axis of the shaft 15. The grinder carrier is shown as having two spaced lugs for engagement upon opposite sides of the lug 21 and at its lower front or free end has oppositely disposed slotted arms 24 to which are connected the two grinder stones 25. These have substantially parallel axes and may be adjusted toward or from each other in the slots of the arms 24, and have their axes firmly clamped in position but with the grinders free to rotate. The grinder carrier 22 at its upper or rear end has a grooved wheel 26 concentric with the pivot pin 23 and rigidly connected to or integral with the upper end of the grinder carrier. The front end of the shaft 15 has a somewhat similar grooved wheel 27, the two wheels being of such size that their peripheries come approximately although not necessarily tangential. The two may be of the same or a different size partly dependent upon the distance through which it is desired to swing the grinders upon a given rotation of the shaft 15. A flexible member 28 has one end secured to the periphery of the grooved wheel 26 and the other end secured to the periphery of the grooved wheel 27, the said member passing from the groove of one member to the groove of the other at the point where the two wheels are approximately tangential. The rotation of the shaft 15 by the swinging of the crank 26 downwardly away from the handle 17 tends to wind up the flexible member 28 on the grooved wheel 27 and correspondingly unwind it from the grooved wheel 26, thereby rotating the latter and swinging the grinders from the position shown in Fig. 1 to the position shown in Fig. 2. I preferably employ a coil spring to effect the return movement of the parts from the position shown in Fig. 2 to the position shown in Fig. 1, upon the release of the crank 26. Although this spring may be mounted at various different points and secured in different ways, I have shown merely by way of example a spring 30 encircling an extension of the pivot pin or shaft 23 and with one end connected to this shaft and the other end anchored on the frame and continually tending to rotate the pivot pin or shaft 23 in such a direction as to hold the grinder in raised position. The tension of this spring may be readily adjusted as desired.

I do not wish to be limited to any particular form of flexible connecting member. Merely by way of example I have shown this member 28 in the form of a helical wire coil encircling and guiding a central wire 29, the ends of both the coil and the wire being connected to the two grooved wheels by set screws extending into the peripheries of the latter. I do not wish to be in any way limited to this particular construction, although experience shows that it operates very satisfactorily. It will be noted that I have shown the axis of the shaft 23 below the axis of the shaft 25. This may be lowered to a still further extent and result in a corresponding shortening of the length of the arm 22. As the flexible connecting member 28 merely passes from one grooved wheel to the other it is permissible that there be considerable variation in the positioning of these axes, and therefore, less expense and time is involved in drilling the bearings for the shaft. It will be noted that the shaft 15 serves to operate not only the grinder carrier but also the guard carrier and that as the shaft rotates, the gear wheel 18 acts on the rack bar 19 to push the guard out of the way and away from the knife before the grinder gets down into operative relationship to the latter.

If the members upon which the flexible member is wound be comparatively large in respect to the range of movement, it will be evident that the flexible member will follow only a portion of the periphery and that therefore complete grooved wheels need not be employed as grooved sectors will be sufficient. The peripheries need not necessarily be concentric with the axis of oscillation as a spiral surface would give an increased or a decreased rate of movement.

Having thus described my invention, what I claim as new and desire to secure by Letters Patent is:

1. A cloth cutting machine, having a rotary knife, an oscillatory grinder carrier having its axis approximately parallel to the axis of the knife, a shaft having its axis slightly above the axis of the grinder carrier and substantially parallel to the plane of the knife, a pair of grooved wheels closely adjacent to each other, one secured to said shaft and the other to said grinder carrier, and a flexible connecting member having its ends secured to the peripheries of said grooved wheels for swinging said carrier upon the rotation of said shaft.

2. A cloth cutting machine of the rotary knife type, having an oscillatory shaft, a grooved wheel, and a pinion secured thereto, a grinder carrier, a knife guard carrier, a grooved pulley connected to one and a rack bar connected to the other, said rack bar meshing with said pinion, and a flexible member having its ends secured to said grooved pulleys.

3. A cloth cutting machine of the rotary knife type, having an oscillatory shaft, a pulley, and a pinion secured thereto, a grinder carrier, a knife guard carrier, a pulley connected to one and a rack bar connected to the other, said rack bar meshing with said pinion, and a flexible member connecting said grooved wheels.

4. A cloth cutting machine of the rotary knife type, including an oscillatory grinder carrier, an oscillatory operating member having its axis at an angle to the axis of the carrier and slightly above the latter, a pair of members, one secured to said carrier and the other to said operating member, and a flexible connecting member secured to each of said operating members at points thereon spaced from the axes of oscillation and adapted to wind upon one as it unwinds from the other in the swinging of said carrier.

Signed at New York city, in the county of New York, and State of New York, this 4th day of December, A. D. 1918.

MARTIN ZAWISTOWSKI.